Patented May 29, 1923.

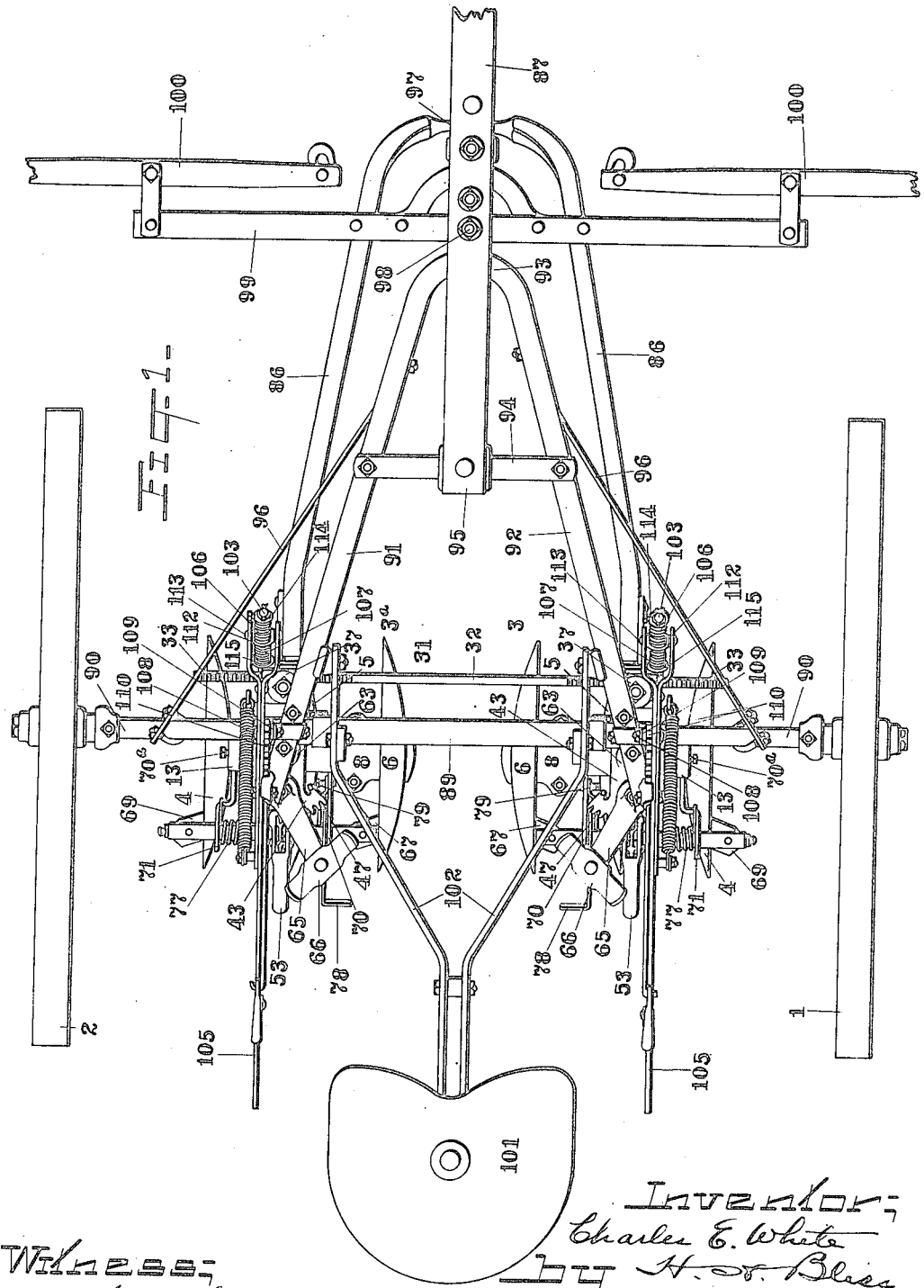

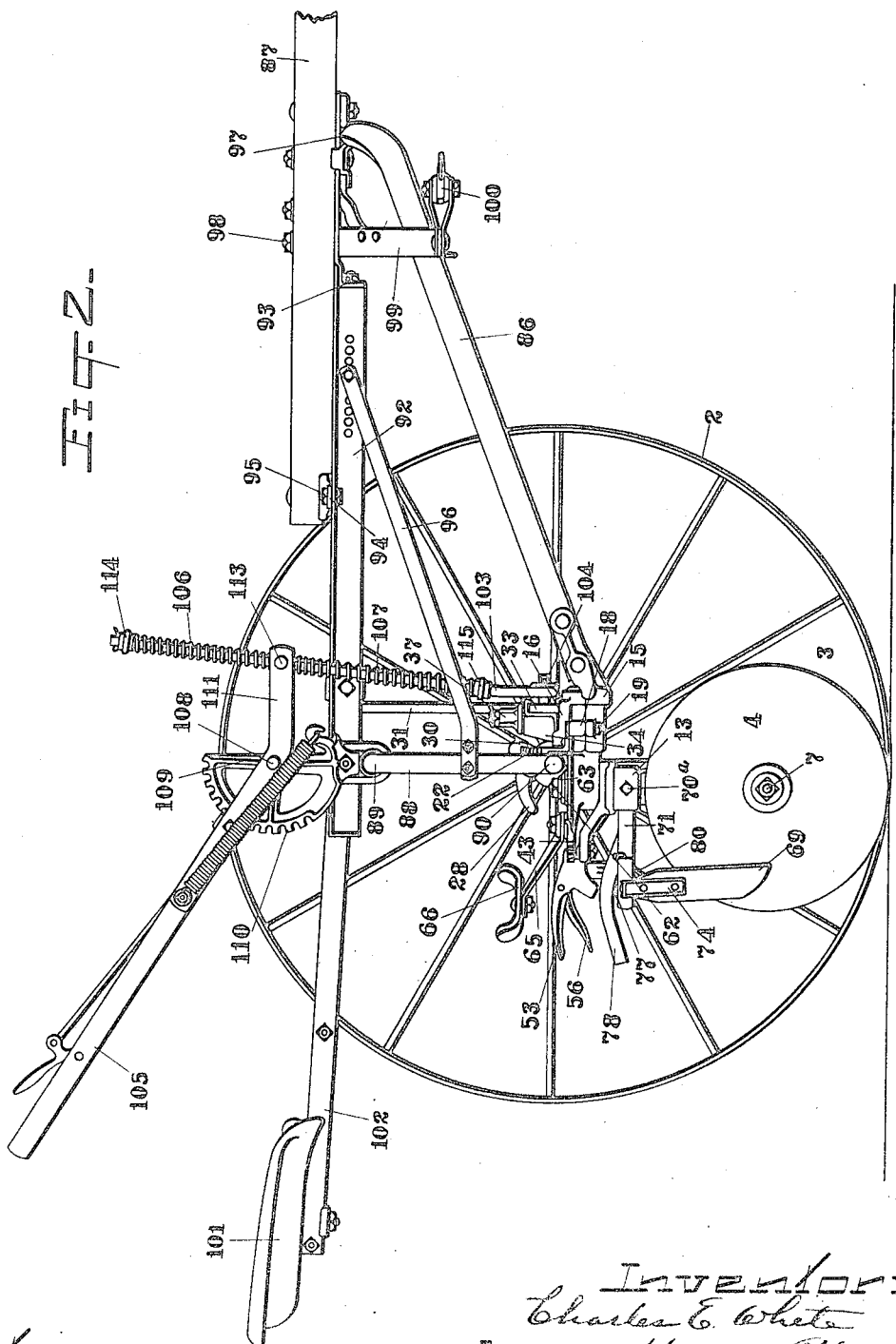

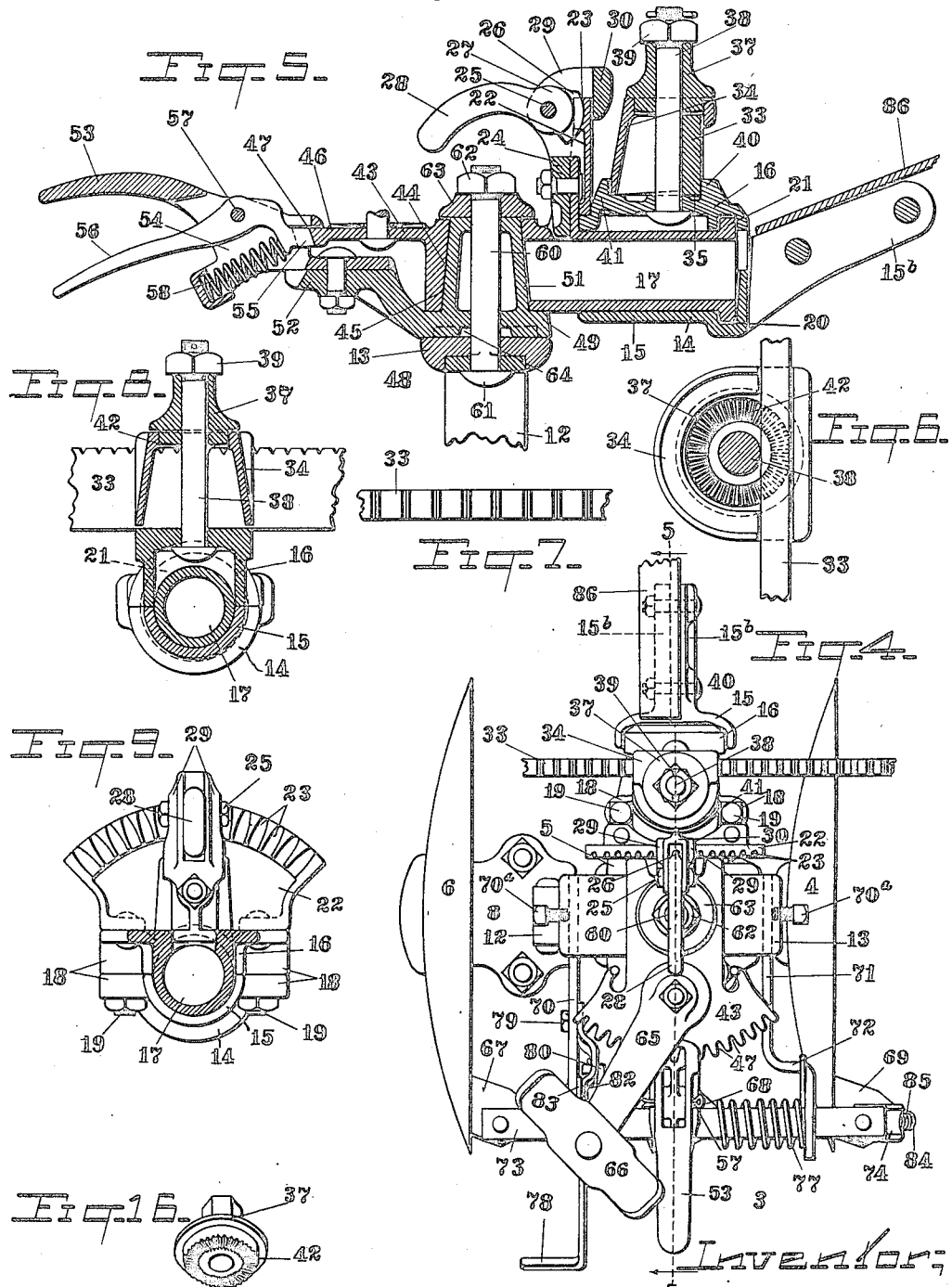

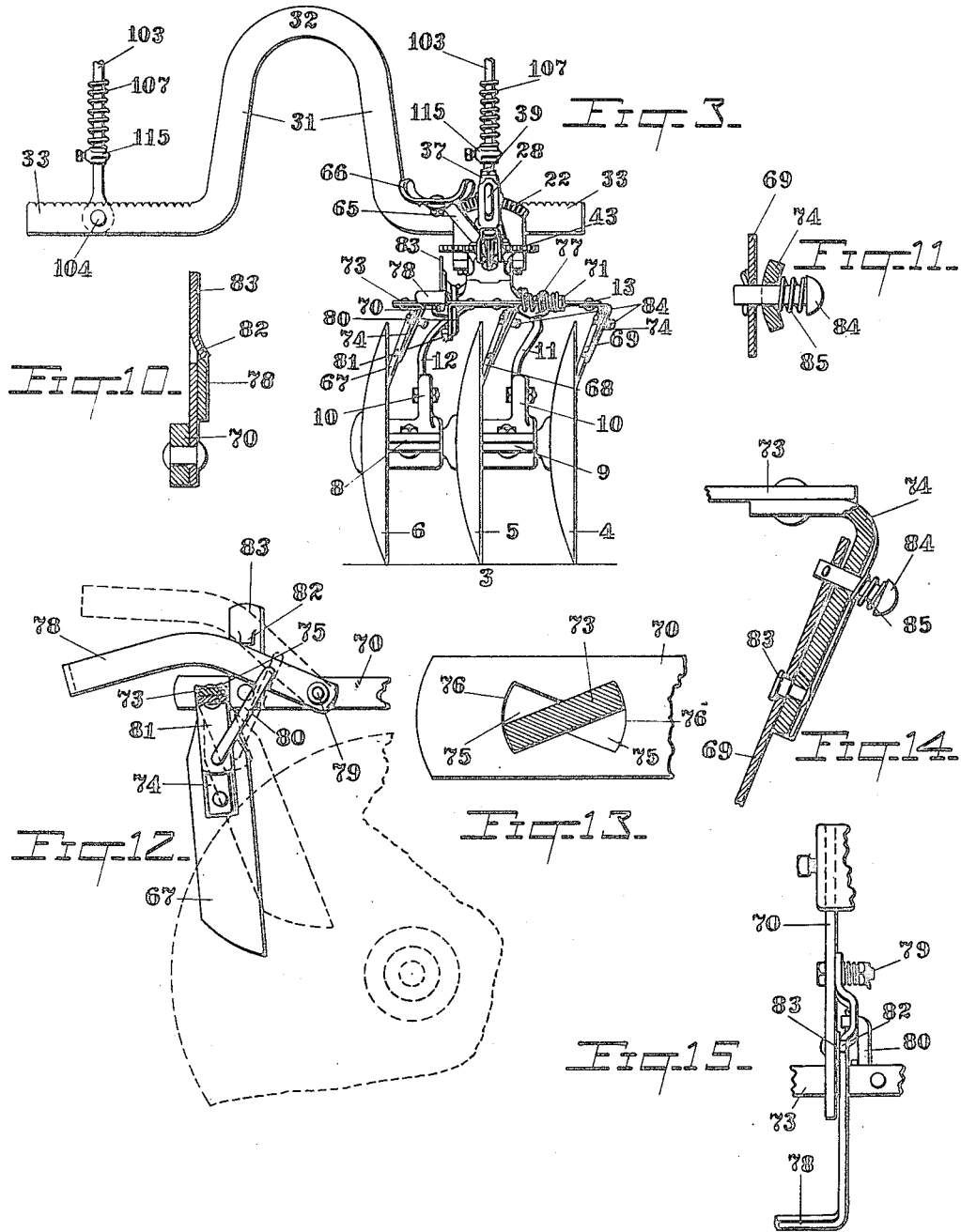

1,456,581

UNITED STATES PATENT OFFICE.

CHARLES E. WHITE, OF MOLINE, ILLINOIS, ASSIGNOR TO DEERE & COMPANY, OF MOLINE, ILLINOIS, A CORPORATION OF ILLINOIS.

DISK CULTIVATOR.

Application filed April 24, 1918. Serial No. 230,497.

*To all whom it may concern:*

Be it known that I, CHARLES E. WHITE, a citizen of the United States, residing at Moline, in the county of Rock Island and State of Illinois, have invented certain new and useful Improvements in Disk Cultivators, of which the following is a specification, reference being had therein to the accompanying drawing.

This invention relates to improvements in disk cultivators, that is to say, cultivating implements having rotary concavo-convex earth-engaging disks, for accomplishing the work of cultivating, connected to carriers, together with two relatively large supporting wheels, a wheel frame, a tongue connected to the wheel frame and drag frames or bars extending from the disk carriers forward and upward to the supersubjacent framework.

In the drawings:

Fig. 1 is a top plan view of a cultivating mechanism embodying my improvements.

Fig. 2 is a side elevation.

Fig. 3 is a view of one of the disk gangs and its carrier, and showing the arched crossbar which connects together the two disk carriers.

Fig. 4 is a top view of one of the disk carriers detached and on a larger scale.

Fig. 5 is a longitudinal vertical section on line 5, 5 of Fig. 4.

Figs. 6 to 16, inclusive, show details.

The main ground wheels are indicated by 1 and 2 for supporting the framework to be described, and the disks.

The latter are arranged in two gangs, 3, 3ª, one gang being so disposed in relation to the mechanism as to travel on the right hand side of a row of plants and the other to travel on the left hand side.

The implement is intended principally for use in cultivating and turning the soil in fields where plants, such as corn plants, are growing in lists or trenches. These trenches are formed by plow-like devices which throw the soil from the trenches up and then to the right and to the left on the normal surface of the earth. Walls of the trenches or lists are of varying conformations. The gangs are short axially to correspond with the narrowness vertically of the trench walls.

The discs of a gang are indicated by 4, 5 and 6. They are secured to a shaft 7, which passes through them centrally, this shaft being mounted in two boxes at 8 and 9. Each of the boxes is formed with a forwardly rising standard 10. To these are secured some of the parts of the lower element 48 of the disk gang carrier. The numerals 11 and 12 indicate arms fastened rigidly to the standards 10, and at their upper ends to the connecting crossbar 13. The carrier, as an entirety, includes other parts for example, those indicated by 49, 44, 52, 60, etc., to be hereinafter described.

The parts constituting the lower element of the disk carrier or gang carrier are connected to a supporting mechanism, constructed as follows: The numeral 14 indicates a box-like part having the lower element or half 15, and the upper element 16. These are formed with a chamber which will receive a journal-like part 17, to be fitted therein. The upper and lower elements or halves 15, 16, are secured together by ears 18 and bolts 19. The lower part 15 has forward projecting bars or extensions 15ᵇ, between which is secured the drag bars to be described. The said parts 15 and 16 are so shaped as to provide, when they are secured together, an annular chamber or recess 20, into which is fitted a flange 21 on the end of the journal part 17. This part 17 can be rotated more or less on a horizontal axis in the box structure provided by the parts described, and can be fastened in any of several positions. The numeral 22 indicates a plate secured rigidly to the upper element of the box, and having lock teeth 23, with their thinner edges extending downward. The numeral 24 indicates an arm or bar carried by the journal element 17, and it supports a pivot 25. This pivot supports a lock element in the form of an elongated tooth or rib 26, carried by the hub part 27, mounted on the pivot. As shown, this hub has a curved arm 28, which can serve as a handle to be grasped by the hand when it is desired to rock the hub and lock element 26 downward out of engagement with the teeth 23. The plate 24 has arms 29, which extend up and then over the top of the toothed plate 22, and on the side of the plate opposite the teeth 23 they are connected by a crossbar or plate 30.

This construction and arrangement of parts permits the operator at any time to release the rotary journal part 17 from the plate 22 and to then rock it to the right or to the left, and after adjusting it, as desired, to again quickly lock it in position by letting the handle arm 28 descend. The lock tooth or element 26 and the teeth 23 are so shaped in relation to each other that a gripping or binding effect can be attained when the arm 28 moves downward, and the arms 29 and the plate 30 serve as an abutment, so that the powerful locking action can be secured without straining the parts 22 and 24 away from each other.

The two gang carriers are connected by the bar 31, this having the horizontal end parts 33 and the centrally arched part 32, which permits the bar to pass over the plants that are being cultivated. To each of the horizontal end parts 33 of this bar one of the box structures just described is clamped in the way shown in the drawings.

The upper part of the upper box element 16 is formed with a recess at 35, there being on the front side a straight flange 40 and a curved flange 41 extending part way around the recess. The end part 33 of the crossbar can fit on the top of the part 16 and be in contact with the front flange 40. A holder is added, comprising the parts 34 and 37 and the binding bolt 38 and nut 39. The part 34 fits in the rear part of the recess 35 against the curved flange 41, and extends upward behind the part 33 of the crossbar. It is open at the upper end and adapted to receive a plug-like part 37, which extends somewhat above the upper end of the part 34. The numeral 38 indicates a vertically arranged binding bolt having its head arranged to engage with the upper part 16 of the box, and having a nut 39 above the plug-like part 37. When the nut is forced downward tightly it presses the lower face of the plug-like part 37 forcibly against the bar 33 and binds its lower edge firmly in the seat provided by the flange 40 and the top box element 16.

The fastening devices for the ends of these crossbars 32, 33 have caused much trouble in machines of this sort because of the difficulty in binding them in place after they have been adjusted, frequent adjustments being necessary.

By means of a rose plate connection, such as shown at 42, the parts can be held rigidly together after clamping. The journal part 17 is integral with a plate-like part 43, and a hollow chambered part 44. The latter is formed with a bearing for a vertically arranged journal element to be described. The part 44 is formed hollow so that it can be made sufficiently large and at the same time be light. The walls of the bearing chamber at 45 are preferably tapered.

The rear part of the supporting bar 44 is indicated by 46. At its outer end it has a series of locking teeth 47.

The part, above described, of the carrier for the tools, namely, the part including the vertical bars 11 and 12 and the cross plate 13, is indicated as an entirety by 48, and with it is combined the upper part 49, which is formed with a tapered journal section 51, said journal section being seated in the bearing at 44, 45. Rearward from this journal part there extends the plate or arm 52, which lies below the plate 46. At its rear end it has a handle 53 connected by a curved or inclined section 54. On the parts 53, 54 there is mounted a detent lever, having a detent 55 and a handle 56 pivoted at 57. At 58 there is a spring bearing against the detent end of the lever and tending to hold the detent in engagement with the teeth 47 on the plate 46. Whenever the operator desires to adjust the cultivator gang around its vertical axis, he grasps the handles 53 and 56 and draws upward on the latter. This releases the detent from the teeth 47 and unlocks the gang carrier. Then he can swing it to the right or to the left, as desired, and upon releasing the handle 56 the spring 58 insures its being tightly locked in the position of new adjustment. The lower part 48 of the carrier comprises the above-described arms 11 and 12 and the part 13. This part 13 and the part 49 of the hanger are secured rigidly together by the clamp bolt 60, the head 61 of which lies under the part 13. The upper end of the bolt is provided with a clamping nut 62, which bears against the washer 63, that rests upon the top of the journaled part 43 and carries the strain when the above mentioned parts are drawn upward by the bolt.

Under some circumstances it is desirable to reverse the gang of tools, that is, turn it end for end, bringing the concave sides of the disks inward instead of the convex sides. This is provided for by forming lugs 64 on one of the engaging surfaces of the upper part 49, or the lower part 13 of the carrier, and forming lug-receiving sockets in the other part of the pair. When the gang is to be reversed the nut on the bolt 60 is loosened sufficiently to permit the lug 64 to move down out of the socket; then the carrier can be turned half way around, bringing the lug to another socket and then the nut and bolt are again drawn tightly to place.

To enable the operator to control with his feet the positions of the gangs, foot bars, 65, secured to the plates 43, and stirrups 66 on the ends of the bars, are provided.

The discs of the gang are respectively provided with scrapers 67, 68 and 69. The support for these comprises the arms 70, 71, which are secured to the sides of the part 13, above described. The bar 70 extends backward on substantially straight lines; while that at 71 is offset at 72. A horizontally sliding scraper carrying bar 73 is mounted on these arms 70, 71. Each scraper is carried by a downwardly turned arm 74 rigidly fastened to the main bar 73. The bar 73 can be rocked in relation to the bars 70 and 71. As shown it is mounted in apertures 75 therein, each of these apertures having two similar tapering parts with curved end edges 76, the narrow parts communicating at the center. The bar 73, mounted in these, can rock, as clearly shown in Fig. 13. A coiled spring 77 surrounds the bar 73, and has one end arranged to abut against the offset end of the framebar 71, both longitudinally and axially of the said bar, and as the other end engages with the bar 73, or some attachment, as, for example, the central scraper holder 74, this end of the spring also exerts power both longitudinally and axially of bar 73. When the bar 73 is moved longitudinally against the spring 77 it carries the scrapers 67, 68, 69 away from the concave faces of their disks. When the spring 77 is free to act on the bar and the scrapers, the latter are pressed yieldingly against the disk faces. When the bar 73 is rocked in its seats or bearings 75, the operative ends of the scrapers are moved from points near the hubs of the disks to points near their peripheries. Normally the spring 77 tends to swing them inward toward the hubs or axis, and to yieldingly hold them at their innermost points. They can, however, be swung outward to the peripheries by means of a foot lever 78. It is pivoted by a pin or bolt 79 to the framebar 70, the pivoted end of the lever 78 being held in such a way that it can yield laterally to permit bodily movement at its hinge. It extends backward and upward over the scraper bar 73. It is connected by a link 80 to a crank arm 81, extending down from this bar. The operator, by his foot, can swing the pedal end of lever 78 down, and it, through the link 80, pushes the crank 81 back, and rocks the bar 73 in its seats, and swings the operative ends of the scrapers outward toward the peripheries of the disks.

If occasion arises for holding them at the peripheries for a period of time such that there is liability for the operator's foot to become tired, he can lock the scrapers in their peripheral positions by pushing the lever 78 slightly laterally, and causing it to engage with a stop at 82 on the frame; shown as being formed on arm 83, extending up from bar 70.

The degree of flexibility for the position of the scrapers incident to the parts above described is supplemented by having each of them loosely mounted upon its supporting arm 74. This arm is rounded on its surface, as shown in Figs. 11 and 14. The scraper is held, normally, against this rounded surface by the short headed pin or rivet at 83ª, and the longer pin at 84, both passing through the scraper blade and through the bar 74. The latter pin 84 having a spring 85 interposed between its head and the bar 74, the lower operative end of the scraper is allowed to press yieldingly against the disk surface, as the upper opposite end can swing toward and from the bar 74 under the resistance from the spring 85. It can also rock slightly around a longitudinal axis, being arranged to roll somewhat on the convex surface of the bar 74.

All of these structural features provide for a wide range of adaptation of the scrapers to the disks and of their relative movements while in operation.

The main framebars 70 and 71 of the scraper system have their forward ends inserted in sockets or apertures, extending through the end parts of the plate 13, and they are therein detachably fastened by binding screws 70ª. When the disk gang is to be reversed, as above described, the scraper framebars 70, 71 are released, and drawn out from their sockets; and they are then inserted into the sockets from the opposite sides.

In order to guide the operator in setting the gang carrier and its support properly on the end part 33 of the arched crossbar 31, I form indicator marks on the top of the horizontal end parts 33, as shown in Figure 7. With these as guides the operator can set both carriers correctly at predetermined points, either to have the two gangs positioned equi-distant from the center of the machine, or to vary the position of one or the other, as required.

Each of the disk gangs together with its carrier and supporting frame, is drawn along the earth's surface and controlled, as follows: The numerals 86, 86 indicate drawbars. Each is formed of an L-shaped wrought bar and this is bolted to the forward projecting parts 15ᵇ of the box element 15, above described. These drawbars 86, 86 are elongated and carried forward as far as possible. They are connected to the tongue 87 which extends forward from the uniting devices and also extends therefrom backward toward the axle. The latter is arched, having the vertical parts 88, the top horizontal part 89 and the spindles 90, on which are mounted the aforesaid ground wheels 1, 2. A V-shaped frame, having arms 91, 92, is rigidly secured to the top part 89 of the axle, and extends horizontally forward therefrom to a line considerably in advance of the rear end, of the tongue and at 93 is connected thereto. It is also connected to the rear end part of the tongue by a crossbar 94 and devices at 95.

The numerals 96, 96 indicate braces having their rear ends firmly secured to the vertical parts 88 of the axle, and adjustably connected to the arms 91, 92, respectively, of the V-shaped frame. The drawbars 86 at their upper forward ends are more or less universally connected to the tongue, preferably having balls at the ends fitted in sockets provided on the under side of the tongue, these parts being positioned at 97 at points considerably in advance of the front end, at 93 of the V-frame.

The gangs, each rigidly connected to the rear end of one of the drawbars 86 are permitted by the joining devices at 97 to be rocked around axes which are horizontal or approximately so, and also to be adjusted vertically and horizontally relatively to each other, that is, toward and from the ground wheels, and are allowed to be carried outward or inward by the driver's feet either separately, or, when connected by the bar 32, 33, together.

The draft for propelling the implement is applied at 98 at transverse lines between those of the connections of the drawbars to the pole and those of the connections of the V-frame. The numeral 99 indicates an evener or whiffletree pivoted at 98 and extended outward and curved downward to the horizontal plane of the singletrees 100.

The driver's seat 101 is supported upon arms 102, which extend forward and diverge to points suitable for having them connected with the wheel frame, the front ends of these arms being secured to the bars 91, 92 of the wheel frame. Each disk gang, its carrier and the rear part of its drawbar is suspended by a train of devices comprising the link rod 103, its attaching device 104, the hand lever 105 and springs 106, 107. The horizontal parts 33 of the cross connecting bar 31 are provided with the pins or pivots 104, with which engage eyes at the lower ends of links 106. The latter are elongated vertically and extend to points above the main frame. The hand levers 105 are each pivoted at 108 to a bracket 109, secured to the main frame, and formed with a rack segment 110. The lever arm 111 projects forward toward the link 106. It is connected to the latter by a loose collar 112, with trunnions 113 pivoted in the lever arm 111. The spring 106 is around the upper part of the link, bearing against the collar 112 and against a stop 114. The spring 107 bears against the collar 112 also and against the stop 115. After a gang has been adjusted vertically to its normal working position and the lever 105 is locked, the gang is free to rise upward against the pressure of the spring 107. And it is free also to move downward against the resistance of the spring 106. That is to say, each gang and its attachments can float in relation to its lever 105. When it is desired to lift the gangs entirely out of the ground the spring 106 will first be compressed to the limit and then the upward strain will carry up the gang and its attachments.

In disk cultivators of this class each gang is short and has a short axle, as it is necessary to adjust the gang and its axle to either of numerous positions relatively to the line of draft and also to each of several positions relative to horizontal planes. The axle must frequently be thrown and held for a long time at a sharp angle to the horizontal, as in cutting down the earth on the sides or at the tops of the trenches or lists and depositing it in the trenches. Again the angle of the gang must be changed in relation to the line of draft, in order to vary the actions of the disks in their cutting into and engaging with the soil.

It will be seen that the gang carrier comprising the parts 49, 13, 11 and 12, is universally adjustable, practically, in relation to the drawbar and the main holder, that is to say, the carrier is adjustable horizontally around a vertical axis in the holder (17, 43, 44) and the latter is adjustable around a horizontal axis relatively to the drawbar and main holder 14; and further, that there are means for rigidly fastening the carrier in any of these numerous positions. The scraper mechanism is so held that it can be moved with the carrier or with the carrier support into any of these positions, and locked there, even when the gang axle is at a strong inclination to the horizontal or to the line of draft.

In any of these positions of adjustment the operator can, with his foot, through the lever 78, effect the desired shiftings of the scrapers; when he presses down on the lever it rocks the bar 73 in the peculiarly shaped bearing apertures 75, and swings the scrapers outward from points near the disk axis to points near the periphery. This movement of the scrapers causes them to bear with an increasing pressure against the concave sides of the disks, and this pressure tends to move the bar 73 longitudinally against the resistance of the spring 77. When the foot lever is released the reaction of the spring and the inclination of the disk faces cause the ends of the scraper to swing back from the peripheries toward the axis or hubs of the gang.

What I claim is:

1. The combination with a gang carrier and its support, of the frame bars fixed rigidly to the gang carrier, the rocking and longitudinally reciprocating scraper bar mounted in said frame bars, the down-turned arms rigid with the rocking and reciprocating bar, each arm having a rounded face, the scrapers each pivoted at a point near its center to a down-turned arm to permit it to vibrate around lines longitudinal of itself and also around a horizontal axis, and means for yieldingly holding each scraper against the rounded face of its arm.

2. The combination with a gang carrier and its support, of the frame bars fixed rigidly to the gang carrier, the rocking and longitudinally reciprocating scraper bar mounted in said frame bars, the down-turned arms rigid with the rocking and reciprocating bar, each arm having a rounded face, the scrapers, a pivot engaging with each scraper at a point near its center longitudinally and connecting it to a down-turned arm to permit the scraper to vibrate around lines longitudinal of itself and also around a horizontal axis of the pivot, and means for yieldingly holding each scraper against its supporting arm.

3. In a cultivator of the class described the combination with a gang carrier and the support therefor, of the frame bars detachably fixed rigidly to said carrier, the rocking and longitudinally reciprocating bar mounted in said frame bars, the scrapers carried by said reciprocating bar, the foot lever flexibly connected to the scraper bar and pivoted to one of said frame bars loosely and movable bodily relatively thereto while swinging thereon.

4. In a two gang disk cultivator, the combination with a gang carrier and the support therefor, of the frame bars detachably fixed rigidly to said carrier, the rocking and longitudinally reciprocating bar mounted in said frame bars and having a series of rigid downwardly extending bodily swinging arms, the scrapers each loosely held yieldingly on one of said rigid arms, the laterally and vertically vibratable foot lever mounted on the scraper support for rocking the said reciprocating and rocking bar, and the lock stop on the scraper support engaging directly with the foot lever.

5. In a cultivator of the class described the combination with a gang carrier and the support therefor, of horizontally arranged backward extending frame bars detachably and reversibly connected to the carrier, the rocking and longitudinally reciprocating bar mounted on said frame bars, the laterally and vertically vibratable foot lever mounted on one of the detachable frame bars for rocking the scraper carrying bar and the scrapers, the stop lock on the last said frame bar for engaging the foot lever, and the spring bearing against the scraper bar and against a detachable frame bar, each of said scrapers having a supplemental spring interposed in the connection between it and the rocking bar.

6. The combination of the gang carrier, the horizontally arranged backward extending frame bars detachably secured to the gang carrier, the longitudinally reciprocating rocking scraper bar mounted in the said detachable frame bars, the foot lever pivoted to one of the said frame bars and vibratable both laterally and vertically relatively thereto, and means connecting the levers to the scraper bar to rock it.

In testimony whereof I affix my signature.

CHARLES E. WHITE.